United States Patent [19]

Mordini et al.

[11] Patent Number: 4,857,970
[45] Date of Patent: Aug. 15, 1989

[54] SOLAR PHOTO-DEVELOPING PROCESS

[76] Inventors: Joseph Mordini, 76 Suburban TR., Lynchburg, Va. 24501; Robert Risner, 706 Baywood Dr., Sanford, Fla. 32773

[21] Appl. No.: 104,937
[22] Filed: Oct. 6, 1987
[51] Int. Cl.⁴ .............................................. G03B 27/04
[52] U.S. Cl. ..................... 355/113; 355/132; 355/133
[58] Field of Search ............... 355/77, 132, 133, 79, 355/113, 21; 250/317, 318

[56] References Cited

U.S. PATENT DOCUMENTS 171,062 12/1875 Swasey .................................. 355/132
764,938 7/1904 Gage .................................... 355/132
1,677,965 7/1928 Fruwirth ............................... 355/132

Primary Examiner—L. T. Hix
Assistant Examiner—D. Rutledge
Attorney, Agent, or Firm—Leon Gilden

[57] ABSTRACT

A solar reactive device is set forth for imparting images on light sensitive paper. Light sensitive paper is positioned within an open container whereupon a positive transparency is positioned thereover and finally a plastic-like cover encloses the contents. The container is positioned to receive solar light for a time period, whereupon the plastic-like cover is removed along with the positive transparency. Further utilization of solar light effects clarification of an image imparted via the removed positive transparency.

1 Claim, 1 Drawing Sheet

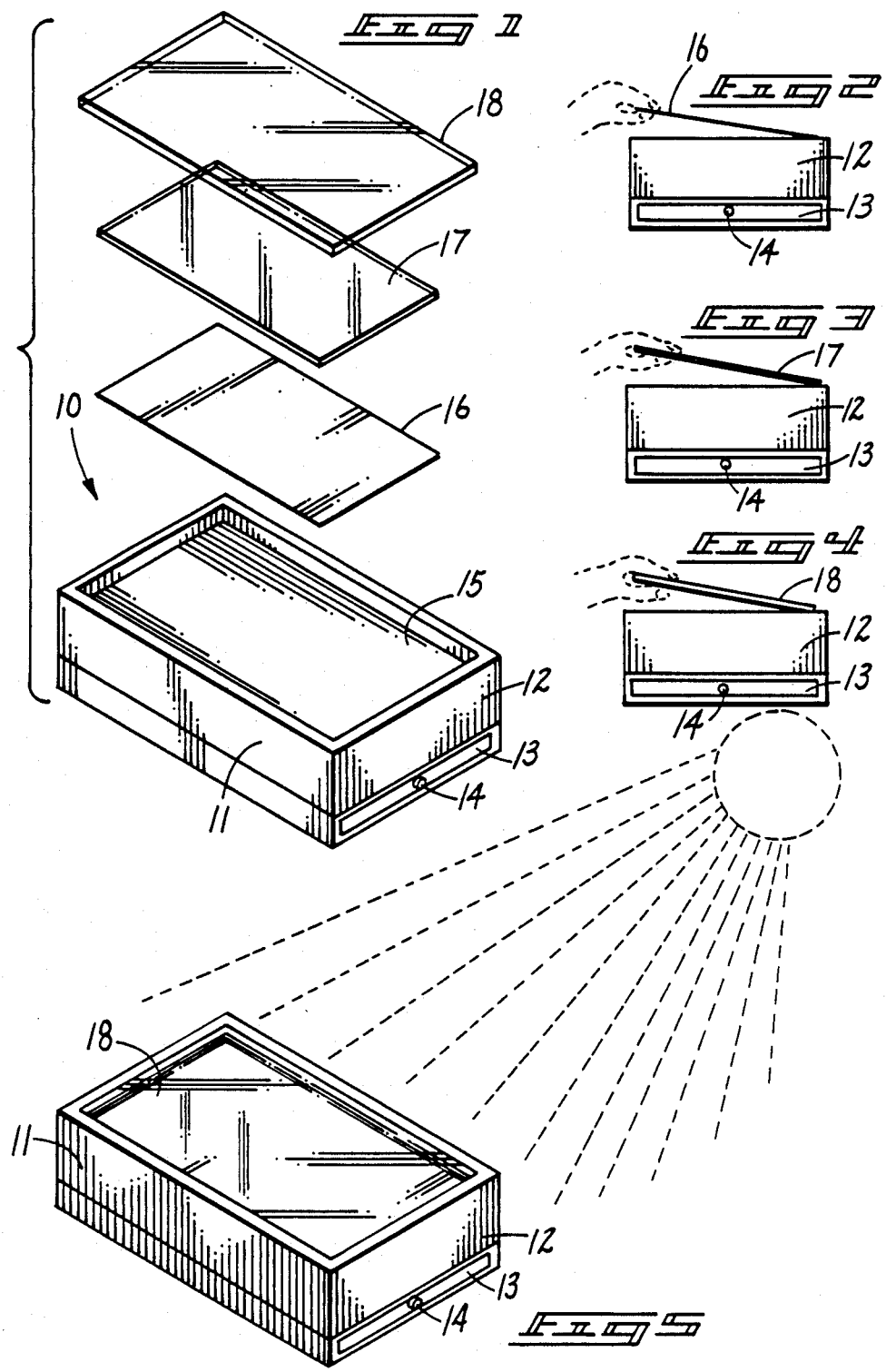

SOLAR PHOTO-DEVELOPING PROCESS

BACKGROUND OF THE INVENTION

1. Field of the Invention

The present invention relates to imparting of images on light sensitive paper and more particularly pertains to a new and improved means of imparting images from a positive transparency onto light sensitive paper utilizing plexi-glass-like material as a first stage shield device.

2. Description of the Prior Art

The treatment of photographic paper is well known in the prior art. As may be appreciated, these devices normally involve the final stage of the photographic process wherein photographic paper is treated with a chemical solution in a photographic dark rooms to develop a photonegative. These devices have normally been associated with a substantial amount of space and equipment enabling the printing of pictures upon appropriate paper. In this connection, there has been a body of art associated with photographic development boxes. For example, U.S. Pat. No. 105,233 to Moulton is an early invention setting forth the use of a plural frame box to bind a sheet of paper positioned within.

U.S. Pat. No. 345,871 to Adams is a further example of a photographic box whose only object is to provide a box of strong and durable characteristic for use in the photographic process. Similarly, U.S. Pat. No. 363,505 to Burnham is simply another example of photographic tray with a finger groove positioned in a medial portion of the bottom of the tray for acceptance of fluids to fill and prevent bubble occurance as a result of agitation of the tray as part of the photographic process.

U.S. Pat. No. 1,547,945 to Mustapich is a patent developed for the purpose of producing a frosted or ground glass affect on films developed therein. The tray member is formed with a rabbeted frame and a pouring spout at a corner of the rabbet enabling a particular affect to be produced on developed film. While this invention has set forth a variation of previous development procedures, the association with the normal photographic process and conventional development techniques is still very much a part of the development process of film with the employment of this invention.

U.S. Pat. No. 2,508,886 to Morsc sets forth a photographic developing tray holder provided with an intake nozzle and overflow passages that is intended to be associated with certain valving for admittance of fluid to be maintained at a certain temperature level to thereby produce a steady or relatively narrow range of temperature of the photographic chemicals within a development tray.

U.S. Pat. No. 3,722,394 to Sebastian sets forth a compartmentalized development tray with an additional tray positionable therein of three sides enabling draining of excess solution into a drainage compartment of the base tray. In this same vein, U.S. Pat. No. 4,104,671 to Harrigan sets forth a pivoting, two-part development tray wherein the cover portion is closable over a lower portion displacing fluids supported in the lower portion and forcing such fluid over print paper and within a parallel surface for development of prints therein.

As such, it may be appreciated that there has existed a continuing need for a new and improved development tray means that addresses the need for printing of preselected positive print material in an environment of mere enjoyment for the user without the attendant need for a host of accessory equipment, supplies, and training. In this respect, the present invention substantially fulfills this need.

SUMMARY OF THE INVENTION

In view of the foregoing disadvantages inherent in the known types of development trays now present in the prior art, the present invention provides an improved solar development tray wherein a user merely positions a light sensitive sheet upon the bottom surface of my invention positioning a transparent positive print thereover and finally securing a plexi-glass plate overlying the previous two items wherein solar light enables development and imparting of a print on the light sensitive paper whereby the plexi-glass will initially filter undesirable ultraviolet rays and enable subsequent development of an image imparted by the aforenoted positive transparency upon successive exposure of the photosensitive paper to unfiltered sun light. As such, the general purpose of the present invention, which will be described subsequently in greater detail, is to provide a new and improved solar development process which utilize advantages of prior art solar development and none of the disadvantages.

To attain the benefit and use of the present invention, a false bottom box is utilized wherein storage of extra materials such as light sensitive paper and positive transparencies are stored in use of may invention. A light sensitive paper is positioned upon the floor of an open side of the box whereupon a positive transparency is merely positioned thereover and the plexi-glass filter is positioned yet over the entire arrangement to sandwich the light sensitive paper and positive transparency between the plexi-glass itself and the floor of the box. Subsequent positioning the box where it may be exposed to direct or to an extent even indirect sunlight will impose an image on the light sensitive paper that will eventually stabilize thereon. To impose and manifest a visual image upon the photosensitive paper, the plexi-glass cover and positive transparencies are removed whereupon subsequent exposure for approximately one-fourth minute to five minutes of the photosensitive paper to exterior sunlight as effected. It is contemplated that multiple positive transparencies such as films and strips may be stacked upon one another to affect the imparting of unique images upon the light sensitive paper and the novel and unusual effects derived thereby.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved solar photo-development process which has all the advantages of the prior art solar development process and none of the disadvantages.

It is another object of the present invention to provide a new and improved solar development tray which may be easily and efficiently manufactured and marketed.

It is a further object of the present invention to provide a new and improved solar development tray which is of a durable and reliable construction.

An even further object of the present invention is to provide a new and improved photo-development process which is susceptible of a low cost of manufacture with regard to both materials and labor, and which accordingly is then susceptible of low prices of sale to the consuming public, thereby making such a solar development tray economically available to the buying public.

Still yet another object of the present invention is to provide a new and improved solar photo-development process which provides in the apparatuses and methods of the prior art some of the advantages thereof, while simultaneously overcoming some of the disadvantages normally associated therewith.

Still another object of the present invention is to provide a new and improved solar photo-development process wherein a positive transparency is sandwiched between light sensitive paper and a plexi-glass filter and exposed to stages of filtered and unfiltered solar light for imparting of an image upon the light sensitive paper.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of my invention as an exploded view illustrating the development box, light sensitive paper, positive transparency, and plexi-glass filter.

FIG. 2 is an orthographic frontal view of my invention illustrating the positioning of light sensitive paper within the development tray.

FIG. 3 is a front orthographic view of my invention illustrating the positioning of a positive transparency within my development tray.

FIG. 4 is a front orthographic view of my invention illustrating the positioning of a plexi-glass filter onto my development tray.

FIG. 5 is an isometric view of my invention illustrating the positioning of my invention to accept solar light.

DESCRIPTION OF THE PREFERRED EMBODIMENT

With reference now to the drawings, and in particular to FIG. 1 thereof, a new and improved solar development tray and process embodying the principles and concepts of the present invention and generally designated by the reference numeral 10 will be described.

More specifically, it will be noted that solar development tray 10 is formed of elongate sides 11, a rear side and a forward matching front side 12. A tray member 13 is reciprocatable within a compartment positioned within solar development tray 10 and is located below a floor 15 of said tray. A knob element 14 is located on tray 13 enabling said tray to be readily removable and repositionable within said solar development tray 10 to conveniently store material utilized in my process such as positive transparencies and extra photosensitive paper.

The array of elements positionable upon floor 15 of tray 10 is illustrated in proper sequence in FIG. 1 with light sensitive photographic type paper 16, a positive transparency 17 sequentially next, and finally plexi-glass filter element 18.

Reference to FIGS. 2, 3 and 4 illustrate the use of my invention wherein light sensitive paper 16 is initially positioned on floor 15, thereafter a pre-selected positive transparency 17 is positioned upon light sensitive paper photographic type 16. It should be noted that any positive transparency will suffice such as a sketch upon a transparency to create a desired design pattern. Finally, as illustrated in FIG. 4, the plexi-glass filter is put in an overlying position relative to the light sensitive paper and positive transparency 17. The aforenoted assembly is normally effected indoors in a protected environment sheltered from sunlight.

Reference to FIG. 5 illustrates my solar development tray 10 positioned in an outdoors location and generally about one-quarter to minute five minutes of time may elapse whereupon the user may remove the plexi-glass-like cover and the positive transparency. A negative has appeared on the sheet and will fade, then suddenly the positive appears and stabilizes in an artistic manner upon the light sensitive paper 16 when further exposed to more direct and unfiltered sunlight for another period of time of approximately one-quarter to five minutes.

The plexi-glass filter is used for filtration of to varying degrees of the ultra-violet rays. Glass may be utilized but its utilization involves an added danger due to its fragile nature and its use would tend to dictate the use of a negative transparency rather than a positive transparency. Therefore the preferred use is the arrangement of a positive transparency sandwiched between the light sensitive paper and the plexi-glass sheet.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A process for imaging of designs and configurations onto light sensitive photographic type paper comprising the steps of,
    a. providing an open top tray means of predetermined height and width, and
    b. positioning light sensitive paper within said tray means, and
    c. positioning at least one positive transparency onto said light sensitive paper, and
    d. positioning a plexi-glass like filter member to completely overlie said light sensitive paper and said positive transparency to form an assembly, and
    e. exposing said assembly to sunlight to thereby impart an image onto said light sensitive paper, and
    f. removing said plexi-glass like filter and said tray means and further exposing said light sensitive paper to further sunlight to impart a final image onto said paper, and
wherein the providing of said open top tray means includes the step of providing of a removable storage tray within said open top tray means proximate the base thereof, and
wherein exposing said assembly to sunlight is for a period of approximately one-quarter to five minutes, and
wherein a plurality of positive transparencies are positioned onto said light sensitive paper to create an ornate configuration onto said light sensitive paper, and
wherein exposing said assembly to sunlight includes positioning said assembly to receive indirect sunlight as well as direct sunlight to effect an imaging on said light sensitive paper.

* * * * *